United States Patent [19]

Spillman Jr. et al.

[11] Patent Number: 4,904,085
[45] Date of Patent: Feb. 27, 1990

[54] POLARIMETRIC FIBER OPTIC SENSOR TESTING APPARATUS

[75] Inventors: William B. Spillman Jr., Charlotte; Robert E. Rudd III, Middlebury; Frederick G. Hoff, Bristol, all of Vt.

[73] Assignee: Simmonds Precision Products, Inc., Wilmington, Del.

[21] Appl. No.: 190,291

[22] Filed: May 4, 1988

[51] Int. Cl.[4] ............................................. G01J 4/04
[52] U.S. Cl. .................................... 356/364; 250/225; 356/365; 356/366
[58] Field of Search ...................... 356/73.1, 364, 370; 250/225; 350/371

[56] References Cited

U.S. PATENT DOCUMENTS

| | | | |
|---|---|---|---|
| 2,976,764 | 3/1961 | Hyde et al. | 356/367 |
| 3,559,662 | 1/1971 | Levenstein et al. | 250/225 X |
| 3,741,661 | 6/1973 | Yamamoto et al. | 250/225 |
| 3,901,603 | 8/1975 | White | 250/225 |
| 4,158,506 | 6/1979 | Collett | 356/365 |
| 4,309,105 | 1/1982 | Lebduska | 356/73.1 |
| 4,556,791 | 12/1985 | Spillman Jr. | 250/225 |
| 4,642,458 | 2/1987 | Jackson et al. | 250/225 |
| 4,644,153 | 2/1987 | Ida | 250/225 |
| 4,673,291 | 6/1987 | Heckmann | 356/731 |
| 4,740,078 | 4/1988 | Daendliker et al. | 356/367 X |

Primary Examiner—Vincent P. McGraw
Attorney, Agent, or Firm—Dale R. Lovercheck

[57] ABSTRACT

A sensor testing apparatus which is capable of testing any sensor regardless of the type of polarization the sensor is sensitive to. The testing apparatus comprises a source conditioning apparatus to produce a beam of optical energy of a known polarization state. A polarization conditioning apparatus changes the polarization state of the optical energy beam to any desired polarization state. A transmit quadrant detector detects the polarization of the optical energy and the optical energy is directed to a sensor to be tested. The optical energy transmitted by the sensor is detected by a receive quadrant detector. The polarization state is displayed on the monitor of a computer by virtue of a computer interface with both quadrant detectors.

25 Claims, 12 Drawing Sheets

4,904,085

POLARIMETRIC FIBER OPTIC SENSOR TESTING APPARATUS

BACKGROUND OF THE INVENTION

The present invention relates to sensor testing apparatus and, more particularly, to a fiber optic sensor testing apparatus that produces optical energy of any polarization state to effect sensor testing and evaluation.

Polarization sensitive single-mode fiber optic sensors modulate polarized optical energy to produce a measured signal change. These sensors are used in a wide variety of applications, and, as such, a need exists to test and calibrate these devices to ensure their continued operating accuracy. Since the sensors can be designed to modulate or otherwise affect a particular type of polarized optical energy, it is desirable to construct a sensor testing apparatus that will provide any type or state of polarized optical energy so that any sensor may be tested. The testing apparatus must detect the polarization state of the optical energy it generates and supplies to the sensor under test as well as the polarization state of the optical energy exiting the sensor and provide a meaningful measure of the modulation effect of the sensor upon the source light provided by the testing apparatus.

One of the problems associated with conventional polarimeters is that they are limited in the types of polarization states they provide for test purposes and do not provide optical energy in all polarization states. For example, U.S. Pat. No. 2,976,764 to Hyde et al. presents a polarimeter that transmits only linearly or elliptically polarized optical energy, and U.S. Pat. No. 3,741,661 to Yamamoto et al. transmits only circularly polarized optical energy. Accordingly, these polarimeters are limited to testing sensors which are sensitive to optical energy of the particular polarization state offered by the device.

A drawback associated with conventional testing apparatus is that they require multiple measurements to determine the polarization state of the optical energy transmitted from the sensor thereby lengthening the testing and calibration sequence.

SUMMARY OF THE INVENTION

In view of the above, it is an object of the present invention, among others, to provide a polarimeter which generates and analyzes the polarization state of optical energy.

It is another object of the present invention to provide a polarimeter which simultaneously transmits and detects the polarization state of optical energy transmitted through an optical sensor.

It is still another object of the present invention to provide a polarimeter which detects and analyzes the polarization state of the light modulated by and transmitted from an optical sensor.

In view of these objects, and others, the present invention provides a polarimeter well suited for transmitting optical energy of any state of polarization to a sensor to be tested and simultaneously detecting the polarization state of the optical energy transmitted to the sensor and the optical energy transmitted by the sensor. A light source generates optical energy of a predetermined polarization state, and a polarization conditioner receives the optical energy from the light source and changes it to any user-selected polarization state. In a preferred embodiment, the polarization conditioner includes a first variable retarder positioned at −45° with respect to the optical axis, a second variable retarder positioned at +45° with respect to the optical axis, and a polarization rotator each placed successively along the optical path. The variable retarders utilize photoelastic blocks which are mechanically stressed to alter their birefringent characteristics, and the polarization rotator can be manually rotated to provide all possible polarization states for the sensor or other optical device under test. A beam splitter sends a component of the optical energy transmitted by the polarization conditioner to a transmit quadrant detector, and another component of the optical energy to the sensor under test. The transmit quadrant detector detects the polarization state of the source optical energy prior to presentation to the sensor under test, and a receive quadrant detector detects the polarization state of the optical energy after its passage through the sensor. The signals from the transmit and receive quadrant detectors are analyzed by a computer or other stored program processor which determines and displays the Stokes vectors computed from the signals received from the quadrant detectors to provide an indication of the modulation effect of the sensor under test.

The present invention advantageously proves a compact apparatus for providing optical energy in all states of polarization for testing a sensor and analyzing the manner by the optical energy is affected by that sensor.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
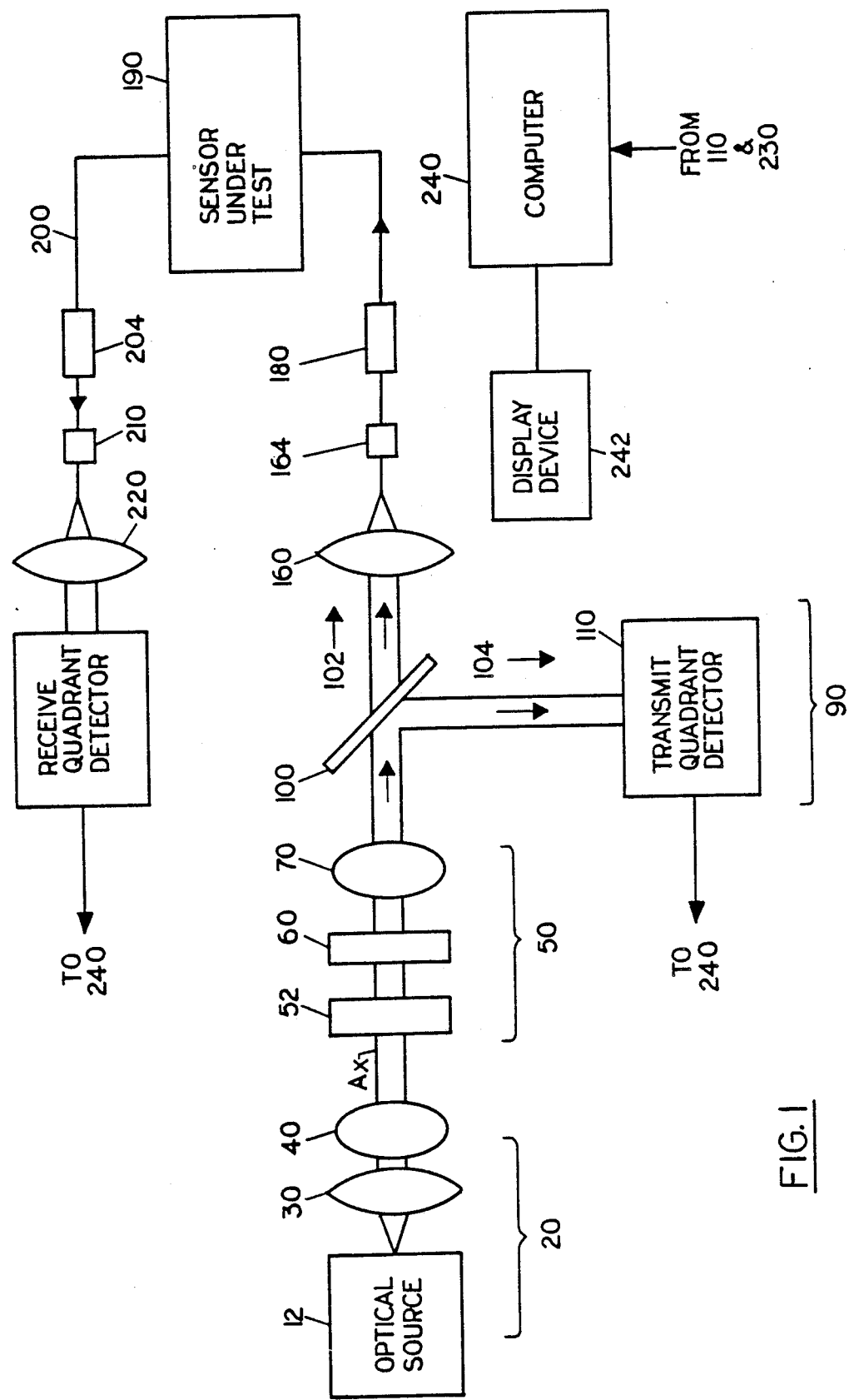
FIG. 1 is a block diagram of the functional layout of the present invention.

A polarimetric fiber optic sensor testing apparatus in accordance with the present invention is illustrated in functional block form in FIG. 1 and is designated generally therein by the reference character 10. As explained in more detail below, the testing apparatus 10 operates to condition optical energy from a light source and polarize the conditioned optical energy in a user-selected polarization state. A portion of the polarized light is made available for reference purposes and another portion is transmitted via an interface to an optical element under test, such as a fiber optic sensor. The optical energy returned from the sensor under test is analyzed using the reference energy to provide a meaningful measure of the sensor characteristics.

As shown in FIG. 1, optical energy is initially provided by a source conditioning section 20 which includes a laser diode 12 that is powered from a suitable source (not shown) to generate an optical output, for example, at 800 nm. A preferred laser diode 12 includes the Mitsubishi ML4102 laser diode. Optical energy generated by the laser diode 12 is transmitted along the principal optical axis $A_z$ to a lens 30 where it is collimated and then presented to a polarizer 40 that receives the collimated optical energy and changes the polarization state of the optical energy to linearly polarized optical energy. In the preferred embodiment, the polarizer 40 is formed from HN-32 polarizer sheet available from the Polaroid Corporation of Cambridge, Mass. 02139.

The linearly polarized light from the polarizer 40 is provided to a polarization conditioning section 50 that includes a first variable retarder 52 aligned at $-45°$ relative the principal optical axis $A_z$, a second variable retarder 60 aligned at $+45°$ relative to the optical axis $A_z$, a polarization rotator 70, these devices disposed successively along optical axis $A_z$ as shown in FIG. 1. As explained below, both of the variable retarders 52 and 60 and the half-wave plate 70 are manually controlled by the user to select the desired polarization state of the output energy.

A beam splitter 100 splits the optical energy transmitted along the axis $A_z$ from the half-wave plate 70 so that a component of the optical energy is reflected along axis 104 to a transmit quadrant detector 110 with the remaining optical energy transmitted through the beam splitter 100 along the axis $A_z$ to a lens 162.

The transmit quadrant detector 110, the structure of which is described below, detects the polarized optical energy along the axis 104 and generates and transmits a set of electrical signals corresponding to the polarization state of the optical energy to a computer 240 where the Stokes vectors are determined and visually displayed on a monitor 242 or other display device associated with the computer 240.

The optical energy that is transmitted through the beam splitter 100 is directed along the axis $A_z$ to the lens 162 where it is collimated and passed through a mode stripper 164 to a single mode optical fiber segment 170 and to a connection interface 180 to the sensor under test 190. The mode stripper 164, which may take the form of a discrete optical device having a small numerical entrance aperture or an optical fiber having a sufficiently small diameter core to prevent or greatly attenuate transmission of any mode above the lowest order mode.

The optical energy presented through the connection interface 180 represents source optical energy that is passed through a connection fiber (unnumbered) to the sensor under test 190. The sensor under test 190 may take the form, for example, for a transducer that alters the polarization state of the optical energy provided from the connection interface in response to a physical perturbation. Such transducers can include birefringent integrated or fiber optic devices that respond to pressure, temperature, physical displacement, and magnetic or electric fields to modulate the energy transmitted from the connection interface 180. In addition to testing transducers or other sensors, various optical devices such as optical couplings, including lateral couplings, can be tested to determine their transmission characteristics.

The optical energy transmitted through the sensor under test 190 passes through an optical fiber 20 through a connection interface 204 and a mode stripper 210 to a lens 220 where it is collimated and presented to a receive quadrant detector 230. As explained below, the receive quadrant detector 230 has the same construction as transmit quadrant detector 110. The receive quadrant detector 230 functions to detect optical energy of any polarization state provided from the sensor under test 190 and provide corresponding set of signals representative of the polarization state to the computer 240 where the Stokes vectors are computed and displayed on the monitor 242, as mentioned above.

Figure 2:
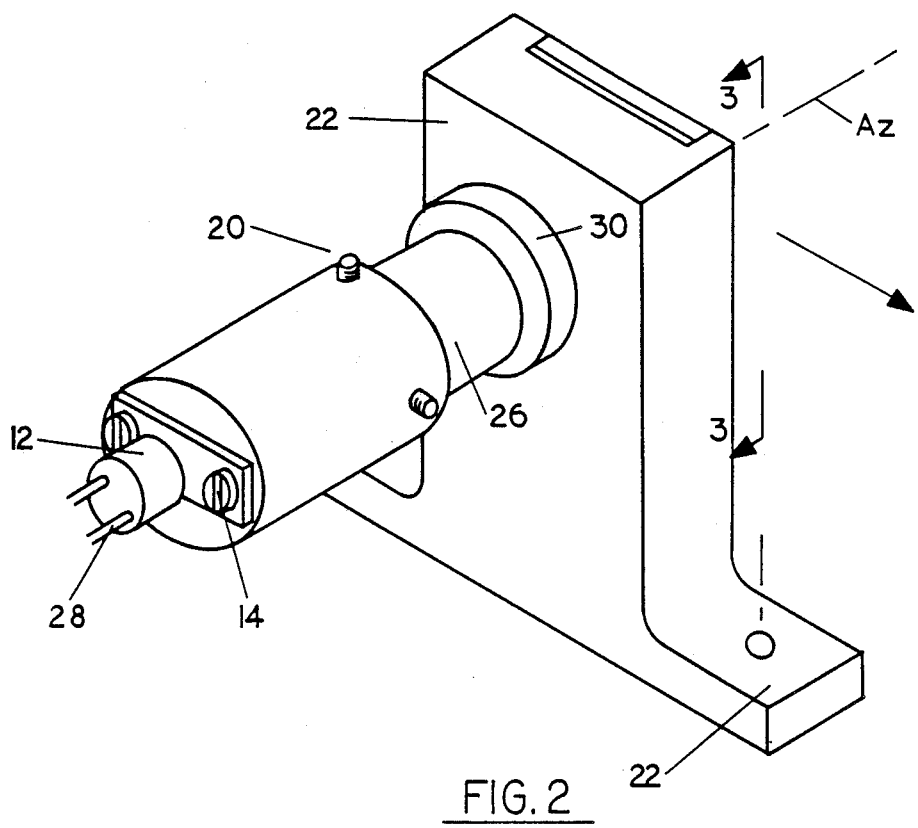
FIG. 2 is a perspective view of source-conditioning section of the present invention.
Figure 3:
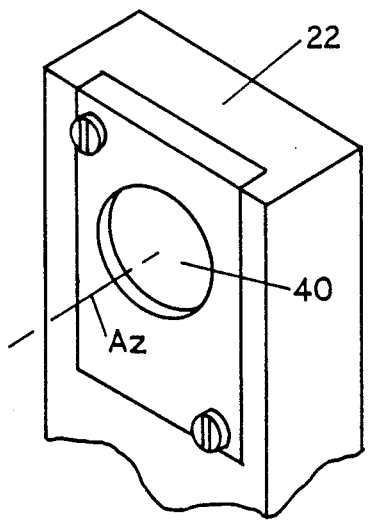
FIG. 3 is a partial perspective view of the source conditioning section as shown along the lines 3—3 of FIG. 2.

The source conditioning section 20 of FIG. 1 is shown in detail in FIGS. 2 and 3 and, as shown, the laser diode 12 is mounted by a bracket (unnumbered) and fasteners 14 to an electrically insulating focus adjustment cap 24 that is mounted upon a microscope objective 26 in a telescoping relationship. An electrical connector is used to establish electrical connection with the laser diode 12 in a conventional manner. The microscope objective 26 is secured to a lens ring (unnumbered), which contains the lens 30, and is mounted on one side of a support 22. The source conditioning section 20 is mounted on a baseplate or chassis (not shown) and, to this end, is provided with mounting feet 22' extending from the lower end. In the preferred embodiment, the microscope objective 26 has a 10×magnification and provides an 8 mm. diameter beam. As shown in FIG. 3, the polarizer 40 is mounted on the opposite side of the support 22 by a suitably apertured plate and fasteners (unnumbered). The polarizer 40 functions to horizontally polarize the optical energy provided from the laser diode 12. The 8 mm. diameter collimated beam is adjusted by moving the adjustment cap 24 along the outer barrel portion of the microscope objective 26 and securing the components in their adjusted position using set screws (unnumbered), as shown in FIG. 2.

In the preferred embodiment, the laser diode 12 is driven by a power source (not shown) designed to continuously power the laser diode 12. The power source includes a slow turn-on feature that applies the drive voltage during a predetermined turn-on period and a control circuit that senses a portion of the optical output of the laser diode 12, compares the sensed signal value to a fixed reference value, and uses the compared values in a negative feedback loop to stabilize the drive level to the laser diode 12. The slow turn-on can be provided by a semiconductor switch that is gated by capacitive components having a one millisecond time constant, for example. This slow turn-on feature provides protection against fast transients from the power supply at turn-on/turn-off and assures that the laser driver circuit turns-on smoothly without overdriving the laser diode 12 and thus avoids damage to the laser diode 12.

The polarization conditioning section 50 of FIG. 1 accepts the optical energy output of the source conditioning section 20 described above and polarizes that energy into a user-selected polarization state using the variable retarders 52 and 60 and the polarization rotator plate 70. The structure of the variable retarders 52 and 60 is shown in FIGS. 4 and 5, and the structure of the polarization rotator 70 is shown in FIGS. 6 and 7.

Figure 4:
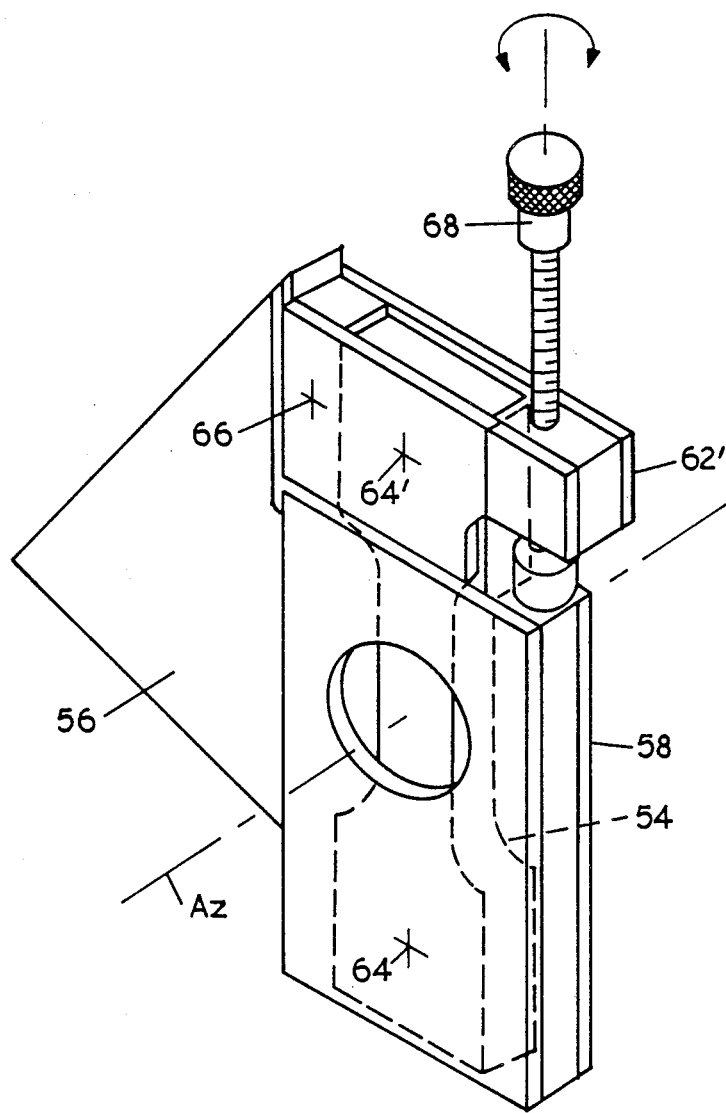
FIG. 4 is a perspective view of a variable retarder of the present invention.
Figure 5:
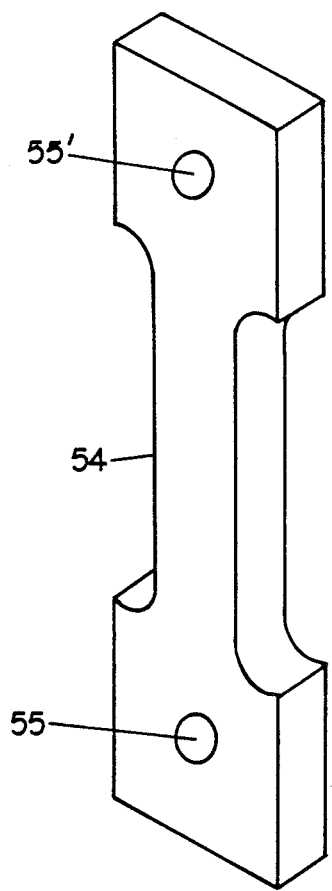
FIG. 5 is a perspective view of a photoelastic block incorporated in the variable retarder of FIG. 4.
Figure 6:
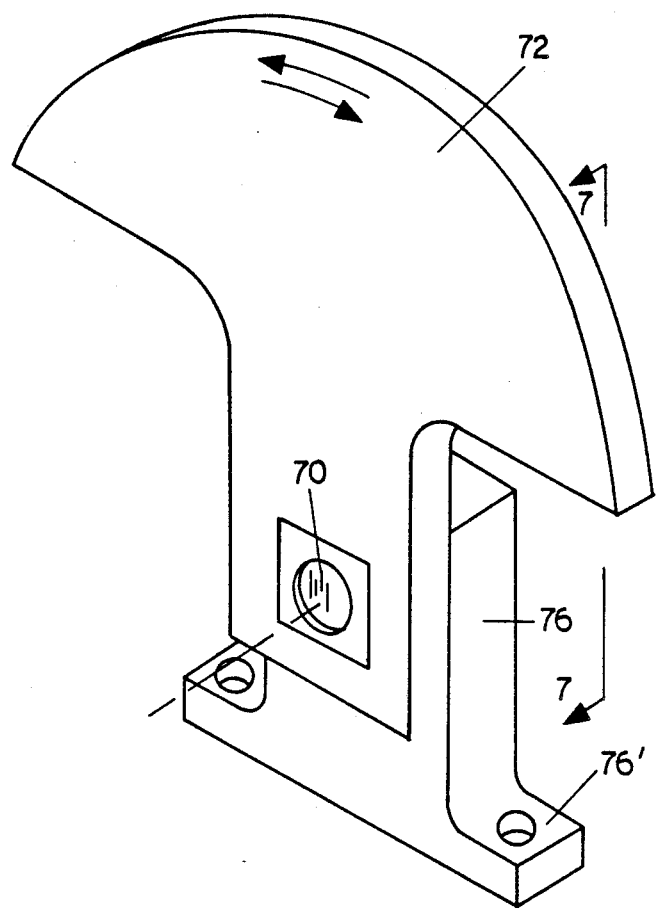
FIG. 6 is a perspective view of a rotatably mounted retarder of the present invention.
Figure 7:
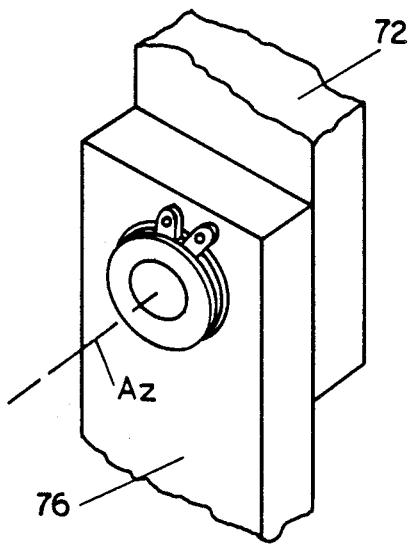
FIG. 7 is a partial perspective view of a retarder of the present invention taken along the 7—7 line of FIG. 6.

As shown in FIGS. 4 and 5, the variable retarders 52 and 60 include a photoelastic block 54 (FIG. 5) disposed within a rigid housing 56 (FIG. 6). The housing 56 has a stationary section 58 that is mounted to the baseplate or chassis (not shown) and a movable section 62 mounted above the stationary section and connected by a pin (not shown) at a hinge or pivot axis 66 to allow the movable section 62 to pivot relative the stationary section 58. The stationary section 58 includes input and output openings (unnumbered) aligned along the optical axis $A_z$. The photoelastic block 54 is mounted at its lower end by a pin (not specifically shown) along axis 64 and at its opposite, upper end to the movable section 62 by another pin (not shown) along axis 64'. As shown in FIG. 5 the photoelastic block 54 has apertures 55 and 55' aligned with pivot axes 64 and 64' through which pins or other fastening devices may pass to secure the photoelastic block 54 in place. A manually operated adjustment screw 68 is mounted in threaded engagement with the movable section 62 with the lower end of the adjustment screw contacting a surface on the stationary section 58. As can be appreciated, rotation of the adjustment screw 68 in the clockwise direction will cause the movable section 62 to pivot counterclockwise about the axis 66 relative to the stationary section 56 and place the photoelastic block 54 under tension. In the preferred embodiment, two full clockwise turns of the adjustment screw 68 will place about 20 lbs. of tensile force between the pivot points 64 and 64'. In general and for the particular material and dimensions of the photoelastic block 54, this will allow up to 360° of user-selectable retardation in the optical energy transmitted through the photoelastic block 54. The variable retarders 52 and 60 will rotate the S(1) Stokes component toward or away from the S(3) component adding ellipticity to the optical energy.

The photoelastic block 54 can be fabricated from a wide variety of materials, particularly normally transparent isotropic plastics, that exhibit optical anisotropy under mechanical stress, these materials including glptols, modified polyester resins, and epoxies exhibiting stress birefringence. In the preferred embodiment, the photoelastic blocks 54 are fabricated from PSM-1 plastic from the Measurements Group Inc., P.O. Box 27777, Raleigh, N.C. 27611. Suitable dimensions for the optically active region of the photoelastic blocks 54 include a transmission thickness of 0.375 inches and a width of 0.600 inches in a direction transverse to the transmission direction.

The polarization rotator 70 is embodied as a rotating half-wave plate is shown in FIG. 6 and is mounted so that its fast axis is horizontal in its home position and can be displaced plus or minus 45° relative the horizontal. In one embodiment, two quarter-wave plates are assembled together to define the composite half-wave plate 70. A movable member 72 includes a hollow, cylindrical bushing (unnumbered) in which the half-wave plate 70 is mounted. The bushing is received in a suitable bore in a stationary mount 76 and is retained in place, as shown in FIG. 7, by a C-clip (unnumbered). The movable member 72 may be any shape and, in the preferred embodiment of FIG. 6, is presented as an inverted sector having a curvilinear peripheral portion that is accessible by the user to rotate the half-wave plate 70 and is mounting bushing. As is in the case of the support 22 of FIG. 2, the stationary mount 76 is provided with feet 76' for mounting upon a baseplate or chassis. Thus, by appropriate tensioning of the photoelastic blocks 54 of the variable retarders 52 and 60 and alignment of the half-wave plate 70, any desired state of polarization can be obtained for subsequent presentation to the sensor under test 190.

The polarization measurement section, designated by the reference character 90 in FIG. 1, includes the beam splitter 100, the transmit quadrant detector 110, and the receive quadrant detector 230. The beam splitter 100 splits the optical energy transmitted along the axis $A_z$ from the polarization rotator 70 into a first that is transmitted to the lens 162 and a second component that is reflected along axis 104 to the transmit quadrant detector 110. The beam splitter 100 may take any form but in the preferred embodiment is a glass slide mounted in a bracket by a suitable clamp (not shown).

Figure 8:
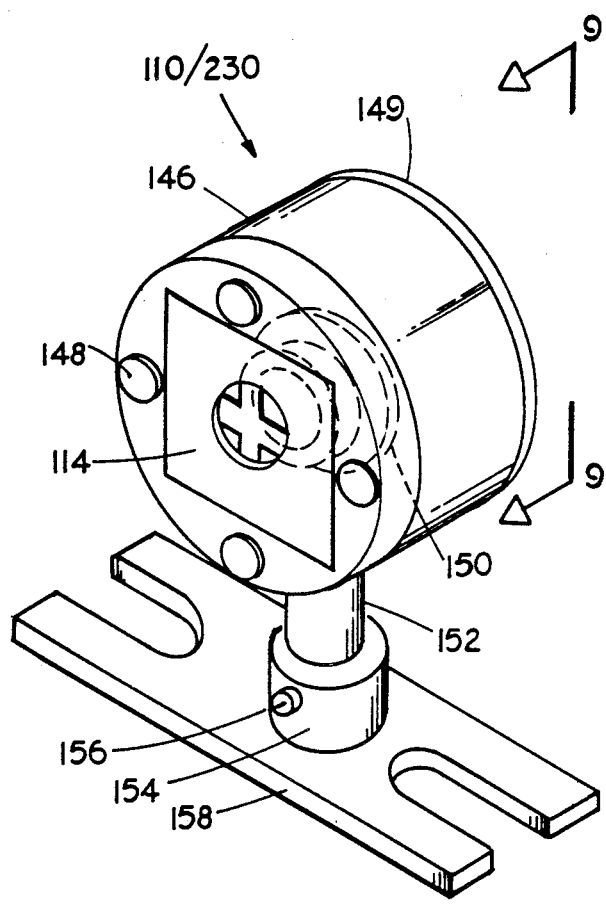
FIG. 8 is a perspective view of a quadrant detector of the present invention.
Figure 9:
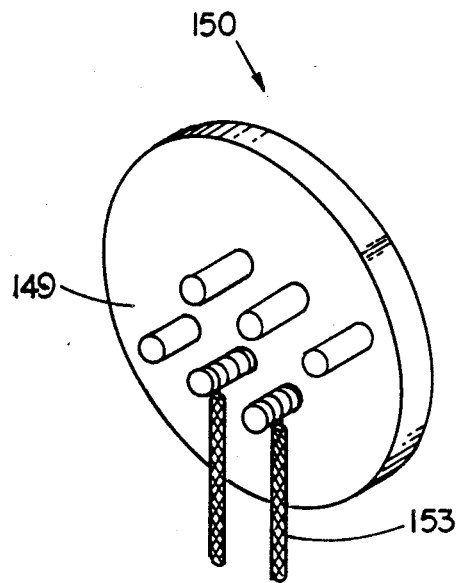
FIG. 9 is a perspective, mirror-image view of a detector plate of the present invention taken along the 9—9 line of FIG. 8.
Figure 10:
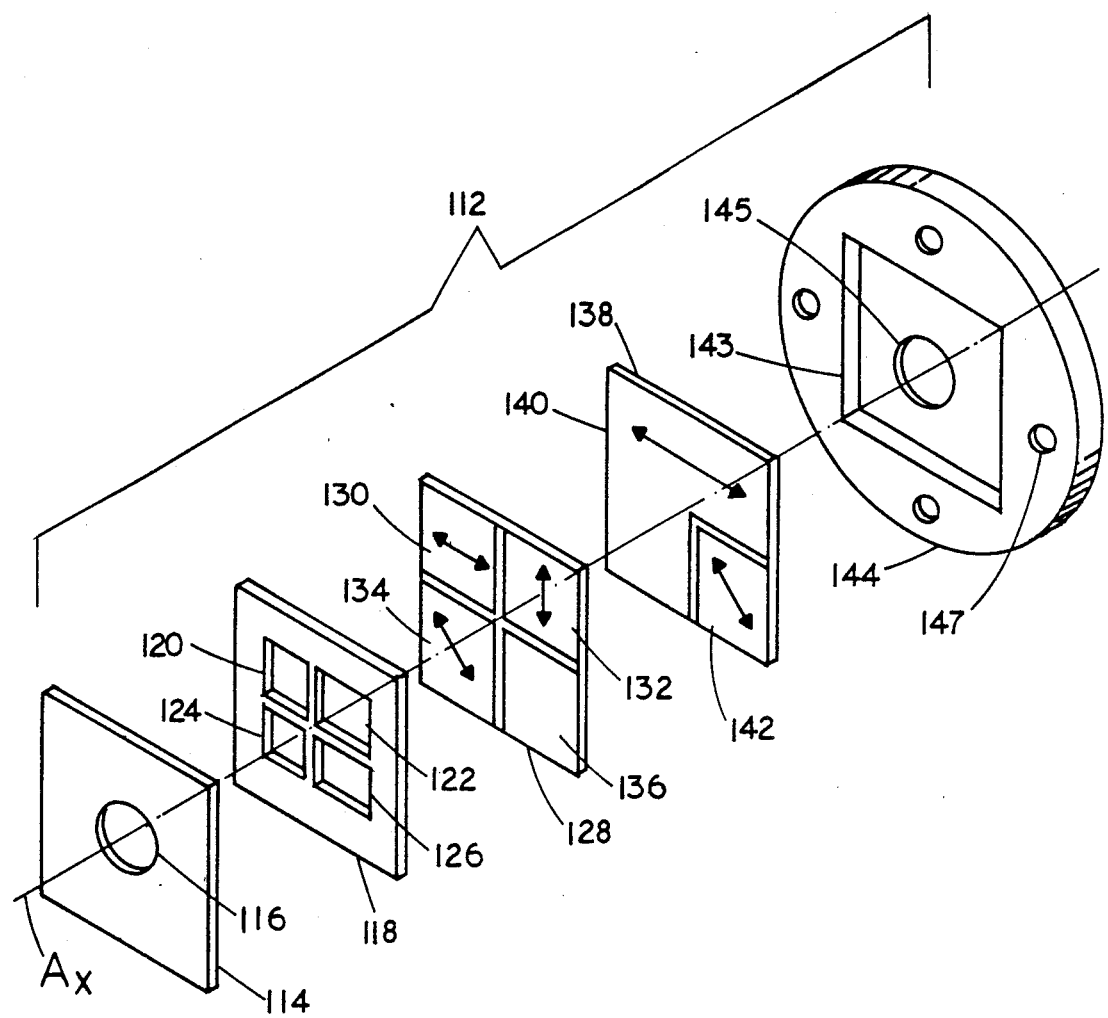
FIG. 10 is an exploded perspective view of a quadrant detectors of the present invention.

The structure of the transmit quadrant detector 110 and the receive quadrant detector 230 are substantially the same and, as shown in FIGS. 8, 9 and 10, includes a detector assembly 112 which houses the quadrant detector 110 or 230. An opaque target mask 114 is mounted on the light entrance side of the detector holder 11 and is formed from an optically opaque material. The mask 114 is provided with an aperture 116 through which the optical energy from the beam splitter 100 passes. The target mask 114 overlies an opaque segment mask 118 (FIG. 10) having four 'windows' designated herein as a first quadrant 120, a second quadrant 122, a third quadrant 124, and a fourth quadrant 126. A multi-quadrant polarizer 128 which includes four discrete polarizer segments is mounted contiguous to the segment mask 118, each quadrant polarizer is provided with a different polarizing function. The first quadrant polarizer 130 has a polarizer segment aligned at 0°, the second quadrant polarizer 132 has a polarizer segment aligned at 90', and the third quadrant polarizer 134 has a polarizer segment aligned at 45°. The fourth quadrant polarizer 136 has a quarter-wave plate at aligned 0°. A wave plate segment 138 overlies the multi-quadrant polarized 128 and has a three-fourth segment 140 which is defined by a quarter-wave plate and one-quarter segment 142 that is defined by a polarizer aligned at 45°. The one-quarter segment 142 is within the path of optical energy passing through the fourth quadrant polarizer 136 of multi-quadrant polarizer 128. All other optical energy passing through first, second, and third quadrant polarizer of the multi-quadrant polarizer 128 passes through the three-fourth segment 140 of the wave plate segment 138. The wave plate segment 138, polarizer 128, segment mask 118, and the target mask 114 are disposed in a contiguous relationship within a recess 143 formed in a mounting plate 144 of the detector assembly 112. The mounting plate 114 also has an aperture 145 which is aligned with the aperture 116 of the target mask 114 so that optical energy can be transmitted through the aperture 116 to the segment mask 118, the polarizer 128, and the wave plate segment 138, respectively, to and through the aperture 145. The mounting plate 144 also has four through openings 147 for accepting fasteners 148 (FIG. 8) to retain the assembled parts together. In the preferred embodiment of the wave plate segment 138, the multi-quadrant polarizer 128, the segment mask 118, and the target mask 114 have been shown as rectangular in shape. As can be appreciated, other shapes that provide the intended function are likewise suitable.

Figure 14:
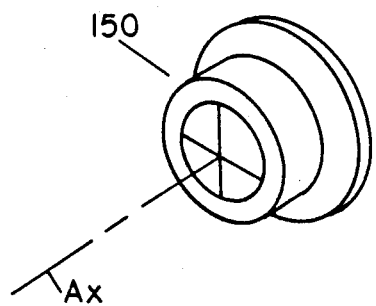
FIG. 14 is a perspective view of a four-quadrant photo-detector of the present invention.

The detector assembly 112 is mounted on a detector support 146 (FIG. 8) by means of the fasteners 148 which are received in apertures 147, as described above. The detector mount 146 houses a photo-detector 150 (FIGS. 9 and 14) which is positioned so that optical energy passing through the aperture 145 passes thereto and impinges on four respective quadrants of the detector plate 150. A suitable photoresponsive detector includes the C30846 quadrant detector provided by the RCA Corporation, Sommerville, N.J. 08876. Each quadrant of the quadrant detector 150 detects its respective quadrant of polarized/retarded energy and provides its output to the computer 242. The quadrant detector 110 or 230 is electrically isolated from the above-described components by means of a bushing 154 (FIG. 8) and is mounted on a detector stand 151 by a shaft 152 that protrudes downwardly from the detector mount 146 and is secured into position on a to stand 158.

The intensity of optical energy which reaches each quadrant of the detector 150 is converted to an appropriate set of electrical signals and supplied through leads 153 (FIG. 9) to the computer 240. The computer 240 then computes the Stokes vectors from the signals received and displays these vectors on the monitor 242.

Figure 12:
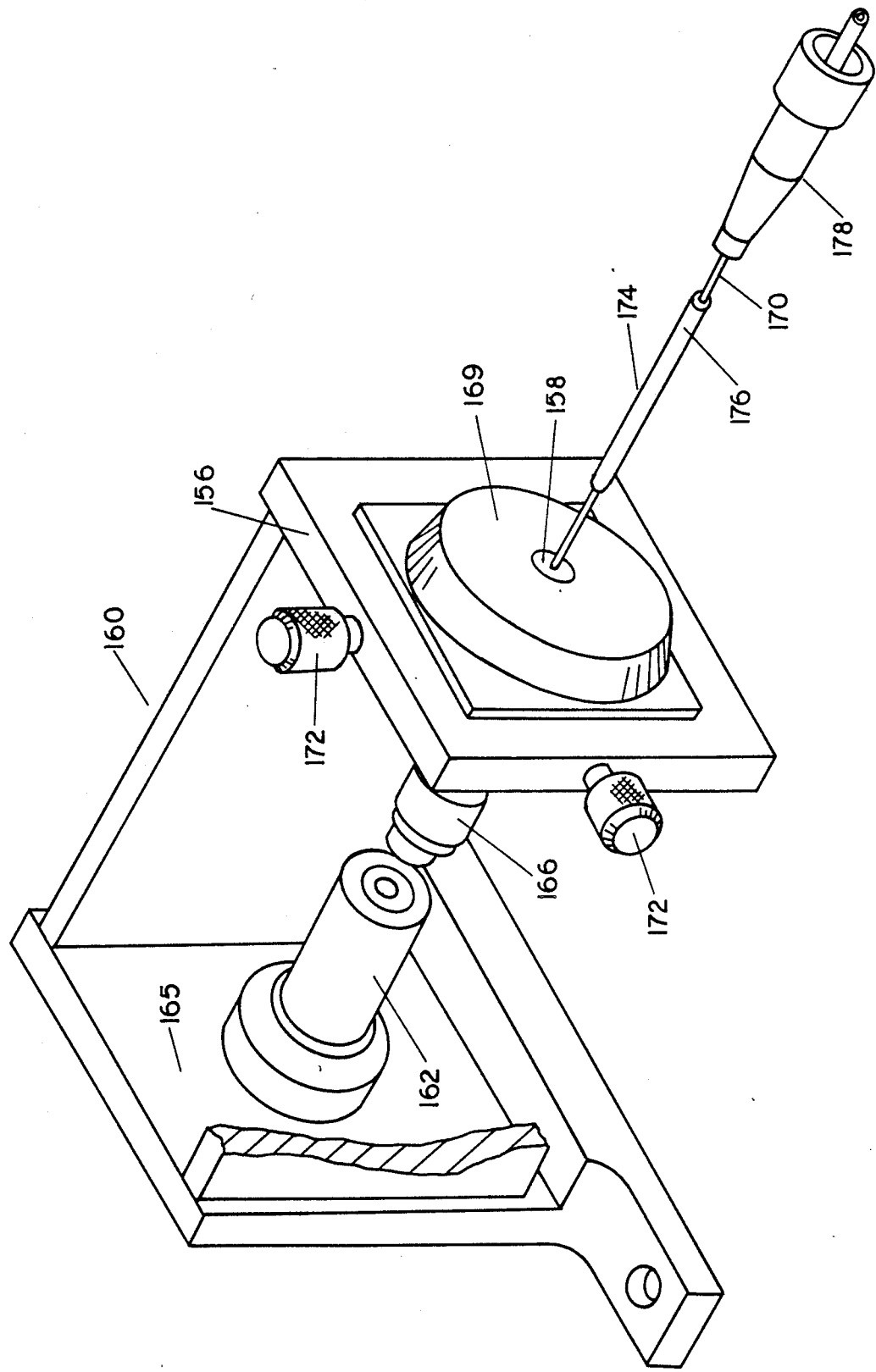
FIG. 12 is a perspective view of a connection interface for presenting optical energy having a selected polarization state to a sensor under test.

The portion of the optical energy transmitted through the beam splitter 100 is directed to the connection interface 160, as shown in FIG. 12, where optical energy is coupled to an optical fiber 170. The connection interface 160 is shown in detail in FIG. 12 and includes a U-shaped bracket 168 having a lens 162, which in the preferred embodiment is a microscope objective. The lens 162 is mounted on an inner face 165 of the bracket 168, and the optical fiber 170 is positioned via a barrel 166 of a position controller 169 on another inner face 156 of the U-shaped bracket 154. An optical fiber chuck 158 is disposed through the position controller 169 and is operated by threaded adjustment screws 172 to receive the optical fiber and closes to hold the optical fiber 170 therein. The optical fiber 170 is positioned to receive optical energy from the microscope objective 162. A mode stripper 174 is provided over the optical fiber 170 to strip all modes higher than the lowest order mode from the optical energy passed through the optical fiber 170. The mode stripping can be accomplished using an integrated device having a sufficiently small numerical aperture or by stripping a portion of the fiber cladding and placing a capillary tube 168 over the stripped section with refractive index matching epoxy introduced into the tube 176 to define a mode stripping segment. The optical fiber 170 is connected to connector 178 by which connection to the sensor under test 190 is effected. As mentioned above, the sensor under test 190 is effective to alter the polarization state of the optical energy provided from the connector 174, usually in response to an environmental condition or perturbation. The altered or otherwise modulated light from the sensor under test 190 is then provided to the receive quadrant detector 230 for comparison with the output of the transmit quadrant detector 110 and a determination of the response characteristics of the sensor under test 190.

Figure 13:
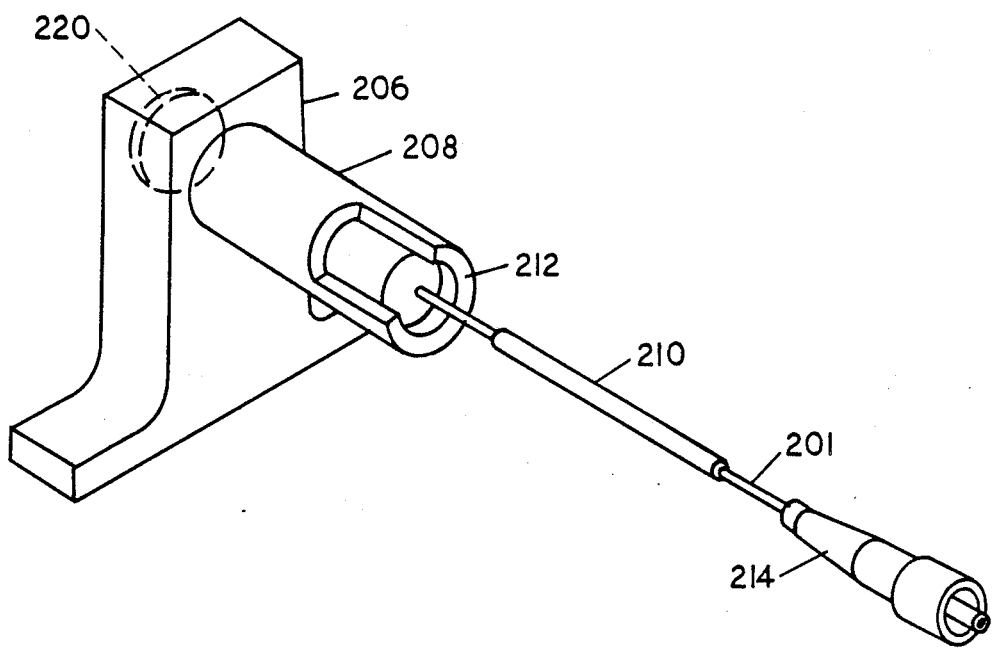
FIG. 13 is a perspective view of another connection interface for accepting optical energy from the senor under test.

Optical energy emitted from the sensor under test 190 is transmitted through the optical fiber 200 to a connection interface 202, as shown in FIG. 13. A lens 220 is mounted in an appropriately sized opening in a housing 206. An adjustment barrel 208 protrudes from the housing 206 and includes an optical fiber chuck 212 therein for receiving the single-mode optical fiber 201. A mode stripper 210 therearound is mounted on the optical fiber and is identical to mode stripper 174 described above. An optical fiber connector 214 is disposed on the other end of the single-mode fiber 201 to connect to the sensor under test 190 to the receive quadrant detector 230.

Figure 11:
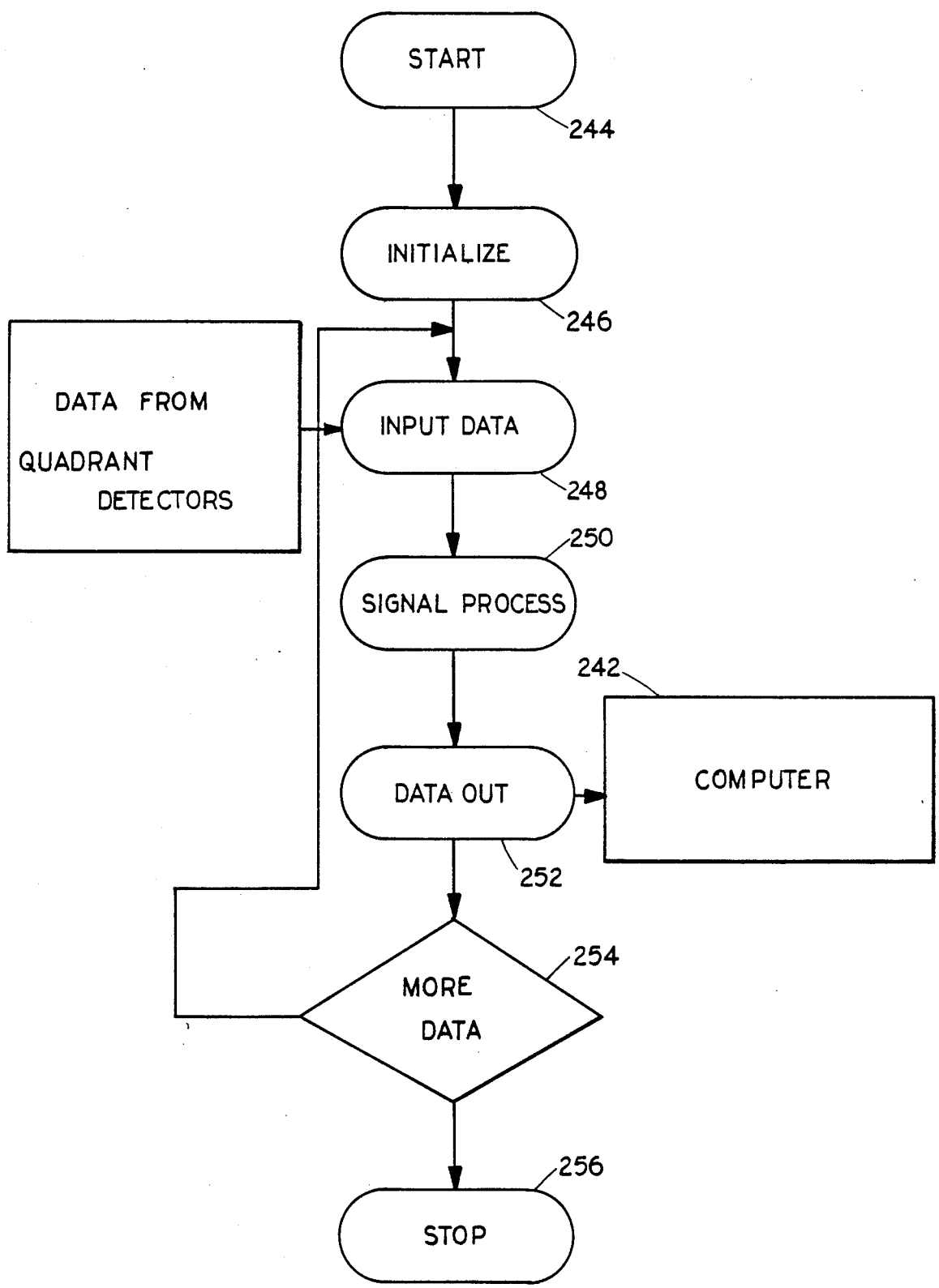
FIG. 11 is a flow chart representing an operational sequence for the present invention.

A flowchart of the operational sequence of the computer 240 is presented in FIG. 11. After the program is started at step 244, an initialization is preformed at step 246 to store or otherwise establish transmit and receive quadrants 110 and 230 calibration values, the beam splitter calibration value, and power calibration values to memory variables. Data from the transmit and receive quadrants 110 and 230 is inputted at step 248 and consists of reading the signals received from the transmit and receive quadrants 110 and 230 which correspond to the optical intensity of the respective quadrants. The program then performs the signal processing at step 250 where the Stokes vectors are computed and the results displayed at step 252 on a monitor 242. Next, a query is presented at step 254 to determine if any more data is to be inputted. If additional data is to be inputted, the program returns to the data input step 248, otherwise the program halts at step 256.

The Stokes vector calculations can be determined from the outputs of the transmit quadrant detector 110 and the receive quadrant detector 230 using the Poincare' sphere construction and Mueller matrix calculus as disclosed in Driscoll, W. ed. *Handbook of Optics* (Optical Society of America 1978) pps. 10–14 et seq., the disclosure of which is incorporated herein.

As will be apparent to those skilled in the art, various changes and modifications may be made to the illustrated polarimetric fiber optic sensor tester of the present invention without departing from the spirit and scope of the invention as determined in the appended claims and their legal equivalent.

What is claimed is:

1. An apparatus to generate and detect any form of polarized light transmitted and received from a fiber optic sensor, said fiber optic sensor having a first fiber optic through which optical energy is supplied to the sensor and a second fiber optic through which said optical energy transmitted by said sensor is transmitted comprising:

optical energy source means for generating and transmitting a beam of optical energy along an optical path, said beam having a first polarization state;
   polarization changing means disposed along said optical path, said polarization changing means being adapted to change the polarization state of said beam having a first polarization state to form a beam of light having a second polarization state;
   a first detector means adapted to detect the polarization of said beam of light having a second polarization state after said beam having a second polarization state exits said polarization changing means;
   means for transmitting said beam having a second polarization state along said optical path to a sensor to be tested, said sensor being adapted to transmit said beam; and a second detector means adapted to detect the polarization state of said beam transmitted by said sensor.

2. An apparatus as in claim 1 wherein said source means generates and transmits a horizontally polarized beam of optical energy.

3. An apparatus as in claim 2 wherein said polarization changing means comprises:
first and second variable retarders; and
a polarization rotator disposed along said optical path.

4. An apparatus as in claim 3 wherein said first detector means to measure the polarization state of said beam transmitted by said polarization changing means is a first quadrant detector and said second detector means to measure the polarization state of said beam transmitted by said sensor is a second quadrant detector.

5. An apparatus as in claim 4 wherein said apparatus further comprises a beam splitter means for splitting the beam of light transmitted by said polarization changing means into a first component and a second component.

6. An apparatus as in claim 5 wherein said first component is transmitted to said sensor and said second component is transmitted to said first quadrant detector.

7. An apparatus as in claim 6 wherein said first quadrant detector comprises:
means for dividing said first component into first, second, third and fourth quadrant components;
a first polarizing means disposed to receive said first quadrant component;
a second polarizing means different from said first polarizing means disposed to receive the second quadrant component;
a third polarizing means different from said first and second polarizing means disposed to receive said third quadrant component;
a quarter-wave plate disposed to receive said fourth quadrant component; and
an intensity detector means to detect the intensities of said first, second, third and fourth quadrant components after said components are transmitted by said, first, second and third polarizer means and said quarter-wave plate respectively.

8. An apparatus as in claim 7 wherein said apparatus further comprises a quarter-wave plate segment disposed between said first, second and third polarizing means and said intensity detector and a fourth polarizer different from said first, second and third polarizers disposed between said quarter-wave plate and said intensity detector.

9. An apparatus as in claim 8 further comprising a data processing means including a monitor which receives a signal from said first and second quadrant detectors and computes stokes vectors based on said signal which are displayed on said monitor.

10. An apparatus as in claim 9 wherein said polarization changing means is manually operated.

11. An apparatus as in claim 10 wherein said first and second variable retarders each include a photoelastic block and at least one knob to control the tension on said photoelastic block.

12. An apparatus as in claim 11 wherein said rotatable half-wave plate is manually rotatable.

13. An apparatus as in claim 12 further comprising:
a first optical fiber interface means to couple said first component to a first optical fiber, said first component travelling through said interface to said first optical fiber of said sensor.

14. An apparatus as in claim 13 further comprising:
a second optical fiber to receive optical energy transmitted to said second optical fiber from said sensor; and
a second optical fiber interface means to couple said optical energy from said second optical fiber to said second quadrant detector.

15. An apparatus as in claim 14 wherein said first optical fiber interface means comprises:
a first lens to collimate said second component of said optical energy;
a second mode stripper disposed around said first optical fiber; and
a second lens to collimate light emitted from said second optical fiber.

16. An apparatus as in claim 15 wherein said second optical fiber interface means comprises:
a connector to connect said second optical fiber to said sensor;
a mode stripper disposed around said second optical fiber; and
a connector connecting said first optical fiber to said sensor.

17. An apparatus as in claim 16 wherein said first and second connectors comprise first and second plugs.

18. A method of testing a fiber optic sensor comprising the steps of:
generating a beam of optical energy;
transmitting said beam of optical energy along an optical path;
horizontally polarizing said beam;
changing the polarization state of said beam to any desired polarization state;
detecting the polarization state of said beam;
transmitting said beam to said sensor;
transmitting said beam out of said sensor;
detecting the polarization state of said beam transmitted by said sensor, 19. A method as in claim 18, wherein prior to said first detecting step comprises:
splitting said optical energy beam into a first component and a second component, the polarization state of said first component being detected and said second component being transmitted along said optical path to said sensor.

20. A method as in claim 19 wherein said first detecting step comprises:
dividing said first component into a first, second, third, and fourth quadrant components;
transmitting said first quadrant component through a first polarizer and then through a quarter-wave plate;
transmitting said second quadrant component through a second polarizer and then a quarter-wave plate;
transmitting said third quadrant component through a third polarizer and then a quarter-wave plate;
transmitting said fourth quadrant component through a quarter-wave plate then a fourth polarizer;
detecting the intensity of each of said components; and
determining the polarization state of said first component from said detected intensities.

21. A method as in claim 20 wherein said second detecting step comprises:

dividing said beam propagated out of said second optical fiber into a first, second, third and fourth quadrant components;

transmitting said first quadrant component through a first polarizer and then through a quarter-wave plate;

transmitting said second quadrant component through a second polarizer and then a quarter-wave plate;

transmitting said third quadrant component through a third polarizer and then a quarter-wave plate;

transmitting said fourth quadrant component through a quarter-wave plate then a fourth polarizer;

detecting the intensity of each of said components; and determining the polarization state of said beam transmitted by said second optical fiber from said detected intensities.

22. A method as in, claim 21 wherein said determining step comprise calculating stokes vectors from said detected intensities.

23. A method as in claim 22 further comprising the step of displaying the stokes vectors on a computer monitor.

24. A method as in claim 22 wherein before said beam is transmitted to said sensor said beam is coupled to a first optical fiber and said beam is transmitted through said fiber to said sensor.

25. A method as in claim 23 wherein before the polarization state of said beam transmitted by said sensor is detected said beam is transmitted by said sensor to a second optical fiber, said beam travelling through and out of said second optical fiber.

* * * * *

UNITED STATES PATENT AND TRADEMARK OFFICE
CERTIFICATE OF CORRECTION

PATENT NO. : 4,904,085

DATED : FEBRUARY 27, 1990

INVENTOR(S) : HOFF, RUDD & SPILLMAN JR.

It is certified that error appears in the above-identified patent and that said Letters Patent is hereby corrected as shown below:

Column 4, Line 20

"fiber 20" should read --fiber 200--

Column 6, Line 34

"holder 11" should read --holder 112--

Column 6, Line 44

"118, each quadrant" should read --118, Each quadrant--

Column 6, Line 47

"90'" should read --90°--

UNITED STATES PATENT AND TRADEMARK OFFICE
CERTIFICATE OF CORRECTION

PATENT NO. : 4,904,085

DATED : FEBRUARY 27, 1990

INVENTOR(S) : HOFF, RUDD & SPILLMAN JR.

It is certified that error appears in the above-identified patent and that said Letters Patent is hereby corrected as shown below:

Column 6, Line 58

"quadrant polarizer"   should read   --quadrant polarizers--

Column 7, Line 64

"connector 174"   should read   --connector 178--

Column 10, Line 41

"sensor,"   should read   --sensor.--

Column 12, Line 4

"in, claim 21"   should read   --in claim 21--.

Signed and Sealed this

Sixth Day of August, 1991

*Attest:*

HARRY F. MANBECK, JR.

*Attesting Officer*   Commissioner of Patents and Trademarks

UNITED STATES PATENT AND TRADEMARK OFFICE
CERTIFICATE OF CORRECTION

PATENT NO. : 4,904,085

DATED : FEBRUARY 27, 1990

INVENTOR(S) : HOFF, RUDD & SPILLMAN 1

It is certified that error appears in the above-identified patent and that said Letters Patent is hereby corrected as shown below:

Column 2, Line 67

"senor"    should read    --sensor--

Column 9, Line 56

"stokes"    should read    --Stokes--

Column 12, Line 5

"stokes"    should read    --Stokes--

Column 12, Line 8

"stokes"    should read    --Stokes--.

Signed and Sealed this

Seventeenth Day of September, 1991

*Attest:*

HARRY F. MANBECK, JR.

*Attesting Officer*    *Commissioner of Patents and Trademarks*